Dec. 31, 1935.  R. C. COLLINS  2,026,161
PNEUMATIC VEHICLE TIRE
Filed Jan. 12, 1934
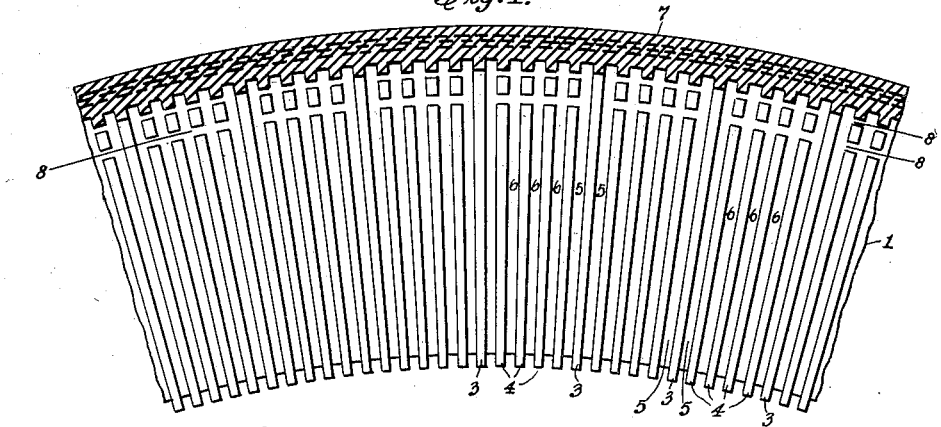
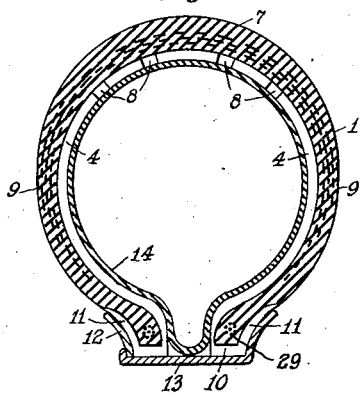
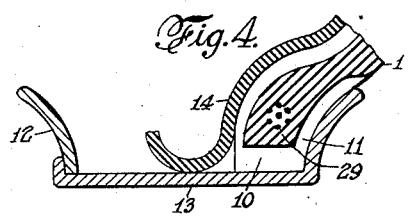
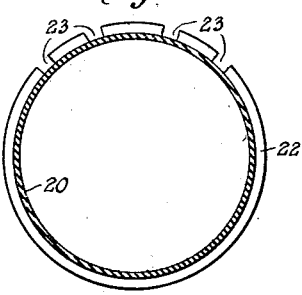
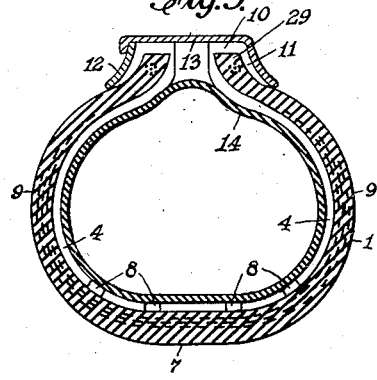
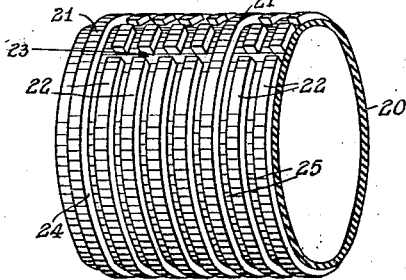
INVENTOR
ROI CASH COLLINS
BY
his ATTORNEY Patented Dec. 31, 1935

2,026,161

UNITED STATES PATENT OFFICE 2,026,161

PNEUMATIC VEHICLE TIRE

Roi Cash Collins, Westfield, N. J.

Application January 12, 1934, Serial No. 706,373

6 Claims. (Cl. 152—13)

My invention relates to vehicle tires and has for an object to provide improved double tube vehicle tires which are ventilated and self cooling and which provide means for automatically reducing the internal temperatures therein while in operation.

At the present time double tube vehicle tires such as are now in common use on motor vehicles which are made of rubber and inflated are subject to intense heat generated by internal friction when in use, and also by contact of the tires with the pavements upon which they are operated. This intense internal heat is very destructive to the tires and is often the cause of tire failure, accident and expense.

In explanation it is pertinent to state that attempts have heretofore been made to construct pneumatic vehicle tires that are insulated from external heat occasioned by friction of the tire in contact with the pavement on which it is operated. Such devices must from the very nature of their function, seal inside the tire any heat generated within the tire itself.

It is well established that friction within the tire itself, when in use, generates a great amount of heat which cannot be insulated against. The air used to inflate the tire is under pressure and as compressed air is hotter than air at normal pressure, it adds to the internal heat of the tire.

External heating of the tire is largely dissipated by the motion of the tire thru the air, when in use, but the internal heat is retained inside the tire and builds up in degree as the tire continues in use. That external heat is of little consequence in regard to its effect upon the inside structure of the tire and that internal heat is the great destroyer, is proved by examining a tire after its operation thru snow and ice and in the low temperature of winter air. The outside of the tire will be found to be relatively cool but the inside of the casing and the tube will be found to be at high temperature.

An object of the present invention is to provide double tube pneumatic vehicle tires which are susceptible of being operated at lower internal temperatures than is now generally possible with tires in general use.

Another object of the invention is to provide tires of this character which are economical in use and susceptible of long service.

Another object of the invention is to provide means within a double tube vehicle tire for the purpose of affording lower operating temperatures, thereby safeguarding the tires from destruction due to excessive internal heating.

Another object of the invention is to provide means for automatically cooling and ventilating double tube tires for the purpose of reducing internal temperatures therein for the purpose of reducing accidents from tire failure and blowouts caused by excessive internal heating.

In the drawing accompanying this application I have shown two practicable embodiments of my invention in which drawing:

Figure 1 is a longitudinal section of the shoe or outer casing for a double vehicle tire, Fig. 2 is a cross sectional view of a vehicle tire made up with a shoe or casing such as is shown in Fig. 1, having within it an inner tube, the casing being shown mounted in a conventional form of casing ring, the parts being shown in the positions which they will occupy when the tire is free of load, Fig. 3 is a view similar to Fig. 2, but showing the parts in the position they will assume when under load. Figs. 2 and 3 together can readily be assumed to represent the upper part and the lower part respectively of a vehicle tire when in use.

Fig. 4 is a fragmentary detail drawn to a larger scale than the preceding figures showing the tire bead, metal supporting rim and the locking rings together with a fragment of the inner tube, in their usual relation to each other when in use, and Figs. 5 and 6 show a modification or alternative form of construction in which the ribs hereinafter described, are shown formed upon the outer surface of the inner tube rather than upon the inner surface of the outer casing; Fig. 5 being a cross section of the inner tube so formed, and Fig. 6 being an elevation of a section of the tube.

Referring first to the form of construction shown in Figs. 1 to 5 of the drawing, the pneumatic tire casing I, sometimes referred to as a shoe, is assumed for the purpose of illustration to be constructed of various rubber compounds and plies of fabric or cords vulcanized together according to present practice in the art but with the addition of air spaces or channels formed between raised portions provided on its inside surface. In the preferred form of my invention the raised portions or protuberances are in the form of ribs 3 and 4, so arranged that air channels 5 and 6 extend transversely around the inside of the tire casing. The ribs and the air channels are shown of rectangular cross-section, but it is to be understood that they may be of some other cross-sectional form if desired.

The ribs 3 are illustrated as being continuous from side to side of the casing. The ribs 4 of the groups between each two adjacent ribs 3 are shown broken in four places at and near the tread 7 of the tire. This is for the purpose of affording intercommunicating longitudinally extending air spaces or channels 8 between all the channels 5 and 6 of each group of transverse channels. In the illustration these rib interruptions do not occur at the center of the tread 7, nor at the sides or flanks 9, at which regions the ribs are maintained in their entirety.

Both ends of the air channels 5 and 6 are shown extending thru or across the beads 29 of the casing and thence outwardly, the reference characters 10 and 11 indicating these extensions. The extension 11 is shown passing beyond the locking rings 12 of the supporting rim 13.

In Figs. 2, 3 and 4 an elastic, inflatable, inner tube or tire 14 is illustrated which is shown resting on the inner surfaces of the raised portions or protuberances afforded by the ribs 3 and 4.

In some cases it may be found preferable to form the raised portions or protuberances on the inner tire member. This arrangement is illustrated in Figs. 5 and 6 in which a number of continuous ribs 21 and interrupted ribs 22 are shown formed on the outer surface of a pneumatic tube 20. The ribs 22 are shown interrupted at four places 23, by way of illustration, which interruptions communicate with the channels 24 and 25 formed by the ribs 21 and 22. For the purpose of illustration the rib and channel arrangement is shown the same in both forms of the invention, altho it is to be understood that this is merely illustrative of the invention.

According to my invention the ribs in all the figures of the drawing are spaced sufficiently close together so that the inner tube or tire member is supported on the surfaces of these ribs or raised portions and bridge over the air channels and are out of contact with the inside body of the casing when inflated and in use, thus allowing the air channels to completely surround the inner tube except at the portion where this is in contact with the supporting rim 13 as shown in Figs. 2 and 4.

It will be readily seen that the purpose of this invention is to provide air spaces or channels for ventilating the inside of pneumatic vehicle tires by means of the construction shown and described, and to accomplish this purpose by holding the inner tube slightly away from the inside body of the tire so as to allow air to circulate around the inner tube and inside of the tire. Ventilation of the inside of the tire is, therefore, accomplished by the raised surfaces being formed on the inside of the tire or on the outside of the inner tube. In use the operation of my invention is as follows:

On account of the flexible nature of the tire casing 1 and the inner tube 14, when inflated and in use, it will be seen that the cross-sectional area of the air channels and ribs will change, or contract and expand as the tire passes over pavement under load. This flexible action, and the consequent increasing and decreasing size of the air channels exerts a pumping action, or a suction and expelling action upon the air in the channels. Thus a circulation of air is set up thru the air channels which is of sufficient force to partially expel the air from the channels out thru the continuation air channels or openings 10 and 11 thru the tire beads and on past the locking rings 12 into the open air. This circulation of air around the inside of tire 1 and outside of inner tube 14 ventilates the inside of tire 1 and reduces excessive internal heat by forcing out most of the heated air and drawing in cooler air from the outside. It will be noted that the ribs 3 and 21 are continuous around the inside of tire casing 1 or outside of tube 20. This construction is for the purpose of preventing circulation of heated internal air around and around inside of tire and remaining inside. Due to flattening and distortion of that portion of tire in contact with the pavement, the heated air in channels 8 or 23 is forced backward or forward inside the tire until it encounters a continuous rib 3 or 21. Having no other outlet the heated air is forced to follow the air channel 5 or 24 adjacent to rib 3 or 21 and is expelled from the tire and into the outside open air thru opening 10—11 near the edge of locking ring 12.

In one aspect of the invention the series of spaces or channels 8 and 23 may be regarded as forming channels longitudinally of the tire, which channels are respectively interrupted or dammed by the continuous ribs 3 and 21 respectively. They are preferably intercepted around the circumference of the tire at a plurality of regular intervals.

It will be noted that the ventilation afforded by the continuations of the channels will generally be closed and sealed by the edges of locking rings 11 in that portion of tire which is in contact with the pavement on account of the flattening and distortion of the tire under load, see Fig. 3. However, it will also be noted that ventilating openings will be open and unsealed around the remainder of tire as shown in Fig. 2. This closing and sealing of openings excludes water and foreign substances from entering within the tire when it is in operation.

While I have shown and described one embodiment of my invention with slight modifications thereof and have used the word "ribs" to describe raised portions between which air channels are formed, it will be understood that this has been chosen for the purpose of illustration and description only, and that I do not desire to be limited to the details of construction shown and described for obvious modifications will occur to persons skilled in the art.

Having thus described my invention I claim and desire to secure by Letters Patent:

1. A pneumatic vehicle tire casing adapted to be used in combination with an elastic inner tube and having a plurality of ribs on its inner surface and extending in a direction transversely of the inner surface thereof, some of said ribs being interrupted and other of said ribs extending entirely around such inner surface, the organization being such that sunken channels are furnished between the ribs, some of which channels are continuous and extend across the bead of the tire and adapted to vent the interior of the casing to the atmosphere.

2. A pneumatic vehicle tire casing of the so-called straight side type and formed with beads at the edges, the casing being adapted to be used with an elastic inner tire and having a plurality of ribbed surfaces formed on the inner surface thereof in such manner that air spaces are provided between the ribbed surfaces, at least some of such spaces extending across the bead and providing means for venting the interior of the casing to the outside.

3. A pneumatic vehicle tire casing adapted to be used in combination with an elastic inner tube and mounted on a rim, having on its inner surface a series of ribs providing channels therebetween, and provided with channels extending across the bead and forming with the rim a passage for venting the said inner channels.

4. A pneumatic vehicle tire casing adapted to be mounted on a rim, comprising a body portion adapted to receive an inner tube therein and having in its inner wall a plurality of spaced grooves extending continuously about the inner surface of the body portion and across the bead portions and opening beyond the rim flanges.

5. In combination with a rim having tire retaining flanges and an inner tube, a vehicle tire casing enclosing the inner tube and retained on the rim, said casing having in its inner wall a plurality of spaced transverse grooves interconnected in groups by longitudinal grooves said groups being non-communicating with each other, at least one of said transverse grooves from each group etxending continuously in and about the beads of the casing and opening exteriorly of the casing beyond the beads for venting the grooves adjacent the rim flanges.

6. In combination with a rim having tire retaining flanges and an inner tube, a vehicle tire casing enclosing the inner tube and retained on the rim, said casing having in its inner wall a plurality of spaced transverse grooves interconnected in groups by longitudinal grooves said groups being non-communicating with each other, at least one of said transverse grooves from each group extending continuously in and about the beads of the casing and opening exteriorly of the casing beyond the beads for venting the grooves adjacent the rim flanges, said rim flanges acting to close the venting groove when the casing is deformed by contact with the road.

ROI CASH COLLINS.